United States Patent Office 3,200,947
Patented Aug. 17, 1965

3,200,947
APPARATUS FOR SEPARATING TOBACCO
AND THE LIKE MATERIAL
Waldemar Wochnowski, Hamburg, Germany, assignor to
Hauni-Werke Körber & Co. K.G., Hamburg, Germany
Filed Sept. 27, 1961, Ser. No. 141,205
Claims priority, application Germany, Oct. 4, 1960,
H 40,584
10 Claims. (Cl. 209—133)

This invention relates to an apparatus for separating tobacco and like material, which apparatus is provided with several classifying separator boxes disposed successively as referred to the travel of the material to be separated, and a blower common to all of them. Such separator boxes were heretofore connected to a blower either on the suction side only or on the pressure side only. The more separator boxes are connected to one of the two blower sides, naturally the larger must be the blower. Since, however, the amount of noise and vibration with large blowers can no longer be held within acceptable limits, there is generally employed a comparatively dimensioned blower for two separator boxes only.

For further reducing the size of the blowers and for better untilization of their capacity, it is proposed according to the invention that the outlet of at least one of the classifying separator boxes be connected only to the suction side and that the inlets of the remaining classifying separator box or boxes be connected only to the pressure side of the blower. Thereby the result is obtained that the size of a blower provided for two or more classifying boxes can be reduced to nearly one half.

If the first classifying separator box is supplied with tobacco by a ripping device, in a preferred embodiment of the invention this classifying separator box is connected to the suction side of the blower, since it has been discovered that the ripped material can be withdrawn better from the stripping device by the action of the suction on the suction side of the blower and then fed to the classifying separator box than by connection on the pressure side of the blower.

Frequently rib removal equipment may embody groups of classifying separator boxes which are similar in construction and are either of even number (for example four) or of uneven number (for example three). When using four classifying boxes, the first two boxes are connected to the stripping device and with the suction side of the blower and the other two classifying separator boxes are connected with the pressure side of the same blower. When there is an uneven number of classifying separator boxes the separator box missing as compared with an arrangement having an even number of separator boxes is replaced by an air control device, for example a throttle device exerting a variable air resistance. In most of these cases the small number of classifying separator boxes is connected to the pressure side of the blower.

Figure 1:
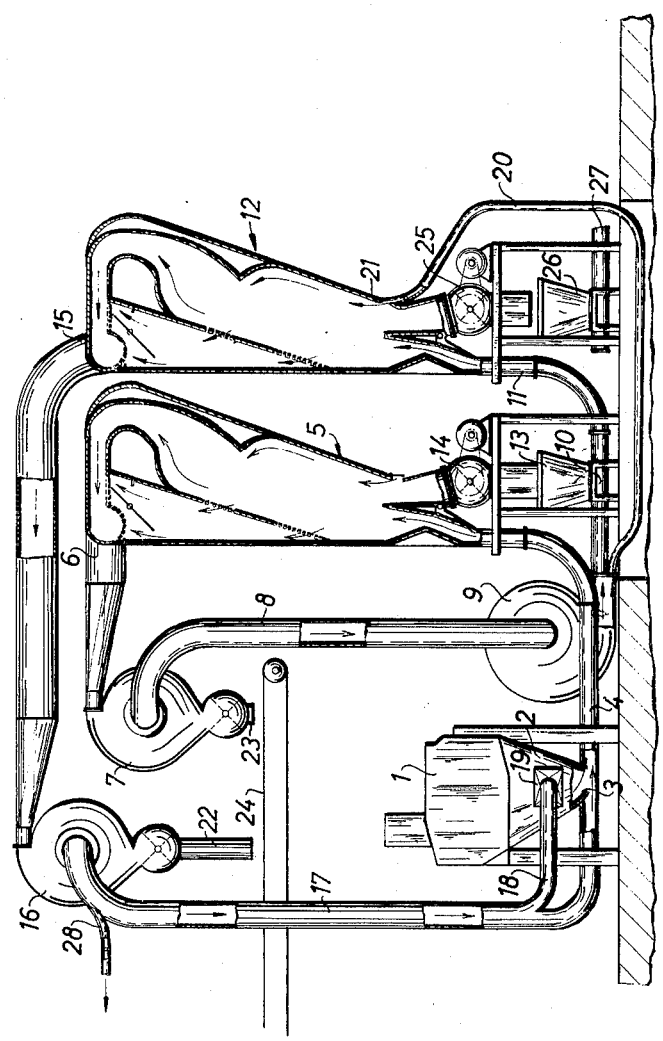
FIGURE 1 is a side elevational view partly in section of a de-stalking plant diagrammatically illustrating a system having two classifying separator boxes.

The plant shown in FIGURE 1 consists of a ripping device 1 below which is arranged a feed funnel 2 leading to an entry nozzle 3. The entry nozzle 3 is connected by a suction pipe 4 with the first classifying separator box 5. An extractor duct 6 connects the upper end of the classifying separator box 5 with a centrifugal extractor 7, the discharge pipe 8 of which is connected to the suction side of a blower 9. The pressure side of the blower 9 is connected by an intake nozzle 10 and a pressure feed pipe 11 to the lower end of a second classifying separator box 12. A collecting funnel 13 connects the entry nozzle 10 with a discharge device 14 associated with the first classifying separator box 5. This connection is air tight as far as possible in order that air under pressure does not pass outwardly in an uncontrolled manner. An air pressure feed pipe 15 connects the upper end of the classifying separator box 12 with a further centrifugal extractor 16, the air pipe of which is connected, as a circulatory air pipe 17, to the entry nozzle 3. In order to lead off the superfluous auxiliary air there is provided a relief pipe 28 branching from the circulatory pipe 17.

The equipment described thus relates to a circulatory air system. Obviously, the connection of the circulatory air pipe 17 with the entry nozzle 3 can be omitted. Moreover, in the circulatory air stream shown two intermediate pipes 18 are connected to openings 19 provided in the two opposite side walls of the collecting funnel 2. Furthermore, the air pressure pipe 11 leading to the second classifying separator box 12 is in communication through a pressure branch pipe 20 with an adjustable secondary air opening 21 in the second classifying separator box 12.

The delivery ducts 22 and 23 leading from the centrifugal separators 7 and 16 terminate above a conveyor, for example an endless conveyor belt 24. The second classifying separator box 12 includes a discharge device 25 connected by a collecting funnel 26 with a pneumatic conveyor pipe 27.

The method of operation is as follows:

The material coming from the ripping device 1 and assisted by the air drawn in through the openings 19, enters the delivery nozzle 3 and is conveyed by the suction pipe 4 to the first classifying separator box 5. The heavier material separated out in the classifying separator box 5 drops into the extractor device 14, while the lighter material is carried onward by the air stream through the suction duct 6 into the centrifugal extractor 7 and is carried off through the delivery duct 23 to the conveyor belt 24. The material reaching the extractor device 14 drops through the collecting funnel 13 into the nozzle 10 and is conveyed by the pressure pipe 11 to the second separator box 12. The heavier material separated out in the latter collects in the discharge device 25, while the lighter material is carried upwardly by the air flow, passes through the pipe 15 into the centrifugal extractor 16 and is discharged by the delivery duct 22 onto the conveyor belt 24. Air leaving the extractor 16 flows through the pipe 17 to the two intermediate pipes 18 and to the entry nozzle 3. The material taken from the discharge device 25 is discharged by the collecting funnel 26 into the pneumatic conveyor pipe 27 and is conveyed, according to the requirements, either to other classifying separator boxes or to another ripping device.

Figure 2:
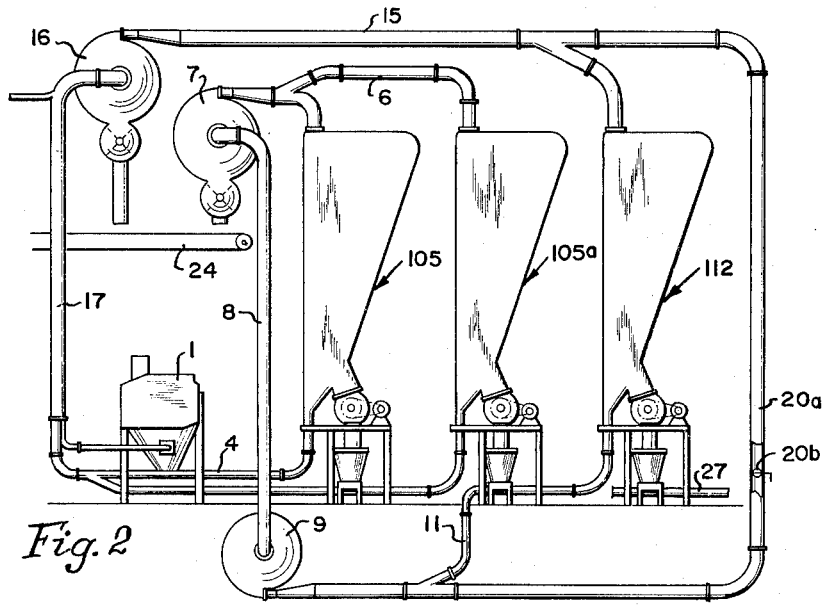
FIGURE 2 is a side elevational view similar to FIGURE 1 showing portions in section and showing a destalking plant having three classifying separator boxes.
Figure 3:
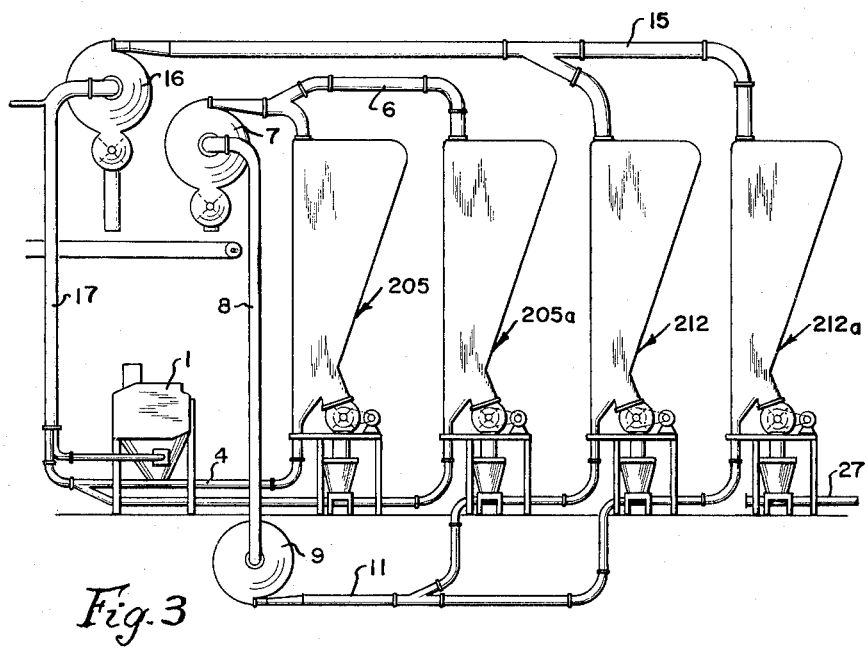
FIGURE 3 is a side elevational view partly in section similar to FIGURES 1 and 2 but including four classifying separator boxes.

If for example three or four classifying separator boxes are connected to the stripping device as shown in FIGURES 2 and 3 instead of two as shown in FIGURE 1, one on two classifying separator boxes will be connected to the pressure side of the blower and two classifying separator boxes to the suction side of the blower. In FIGURE 3, for each two classifying separator boxes there is provided an extractor device for the material after separation. In a conventional plant with four classifying separator boxes as shown in FIGURE 3 there would thus be no additional provision of extractor devices. In the plant previously described with two classifying separator boxes it is indeed necessary to provide one additional classifying separator box but this is insignificant compared with the savings involved in the size of the blower and, in the case of larger plants, the overall consumption of air and power. The forms of the invention shown in FIGS. 2 and 3 are similar to the form shown in FIG. 1 with the exception that FIG. 2 illustrates a de-stalking plant with three classifying separator boxes 105, 105a and 112 while FIG. 3 shows the use of four classifying separator boxes 205, 205a and 212, 212a. In FIGS. 2 and 3, the outlets of the boxes 105, 105a and 205, 205a are connected to the suction side of the blower 9. All other parts of the apparatus shown in FIGS. 2 and 3 are identified by numerals corresponding to those used in FIG. 1. FIG. 2 shows a duct 20a corresponding to the pipe 20 of FIG. 1 and provided with a butterfly valve 20b which varies the resistance to the flow of air from the pressure side of the blower 9.

What I claim is:

1. An apparatus for separating a mixture of lighter and heavier tobacco particles into a first fraction which contains lighter particles and a second fraction which contains heavier particles, including a plurality of classifying separator boxes in a closed pneumatic system located in the order of the movement of the mixture to be separated, said separator boxes being divided into a first group and a second group each including at least one separator box, each separator box having an air inlet, an air outlet and a discharge device for one fraction of treated material, a single blower having a pressure outlet and a suction inlet, means for connecting the suction inlet of said blower only to the outlet in each of said first group of classifying separator boxes and independent duct means for connecting the pressure outlet of said blower only to the inlet in each of said second group of classifying separator boxes, the discharge device of each preceding separator box being arranged to discharge into the inlet of the next following separator box in the order of movement of the material to be separated.

2. An apparatus according to claim 1, further including means for feeding a mixture to said first group of classifying separator boxes.

3. An apparatus according to claim 1, wherein one of said groups comprises an uneven number of classifying separator boxes, and duct means having a variable air resistance and connected with said one group of classifying separator boxes.

4. Apparatus according to claim 3, in which the number of classifying separator boxes in said second group is less than the number of classifying separator boxes in said first group.

5. In an apparatus for separating a mixture containing lighter and heavier tobacco particles into a first fraction which contains lighter particles and a second fraction which contains heavier particles, a series of classifying separator boxes arranged in succession and in a closed pneumatic system, each of said classifying separator boxes being provided with an air inlet at its lower end and an air outlet in its upper end and each having a discharge device for one fraction of classified material, the discharge device of at least one of said classifying separator boxes being connected to the inlet of an adjacent classifying separator box, a single blower having a pressure outlet and a reduced pressure inlet for circulating tobacco through said closed pneumatic system, duct means for connecting the outlets of certain of said classifying separator boxes only to the reduced pressure inlet of said blower, and duct means for connecting the inlets of the remaining classifying separator boxes only to the pressure outlet of said blower so that the blower is connected with each of said boxes.

6. A structure according to claim 5, further including nozzle means for feeding a mixture to at least one of said air inlets, and conveyor means for receiving another fraction of classified material from the outlets of said classifying separator boxes.

7. A structure according to claim 5, in which the number of classifying separator boxes whose inlets are connected only to the pressure outlet of said blower is less than the number of classifying separator boxes whose outlets are connected only to the reduced pressure inlet of said blower.

8. In an apparatus for separating a mixture containing lighter and heavier tobacco particles into a first fraction which contains lighter particles and a second fraction which contains heavier particles, a series of classifying separator boxes arranged in succession and in a closed pneumatic system, each of said classifying separator boxes being provided with an inlet, an outlet and a discharge device for one fraction of treated material, the discharge device of at least one of said classifying separator boxes being connected to the inlet of an adjacent classifying separator box, a single blower having a pressure outlet and a reduced pressure inlet for circulating tobacco through said closed pneumatic system, duct means for connecting the reduced pressure inlet of said blower only to the outlets of certain of said classifying separator boxes, and duct means for connecting the pressure outlet of said blower only to the inlets of the remaining classifying separator boxes.

9. In an apparatus for separating a mixture containing lighter and heavier tobacco particles into a first fraction which contains lighter particles and a second fraction which contains heavier particles, a series of classifying separator boxes arranged in succession and in a closed pneumatic system, each of said classifying separator boxes being provided with an inlet, an outlet and a discharge device for one fraction of treated material, the discharge device of at least one of said classifying separator boxes being connected to the inlet of an adjacent classifying separator box, a single blower having a pressure outlet and a reduced pressure inlet for circulating tobacco through said closed pneumatic system, duct means for connecting the reduced pressure inlet of said blower only to the outlets of certain of said classifying separator boxes, duct means for connecting the pressure outlet of said blower only to the inlets of the remaining classifying separator boxes so that said blower is connected with each of said boxes, nozzle means for feeding a mixture to at least one of the inlets of said classifying separator boxes, and common conveyor means for receiving the other fraction of classified material from the outlets of said classifying separator boxes.

10. In an apparatus for separating a mixture containing lighter and heavier tobacco particles into a first fraction which contains lighter particles and a second fraction which contains heavier particles, a series of classifying separator boxes arranged in succession and in a closed pneumatic system, each of said classifying separator boxes being provided with an inlet, an outlet and a discharge device of one fraction of treated material, the discharge device of at least one of said classifying separator boxes connected to the inlet of an adjacent classifying separator box, a single blower having a pressure outlet and a reduced pressure inlet for circulating tobacco through said closed pneumatic system, duct means for connecting the outlets of certain classifying separator boxes only to the reduced pressure inlet of said blower, duct means for connecting the inlets of the remaining classifying separate boxes only to the pressure outlet of said blower, the number of classifying separator boxes whose inlets are connected only to the pressure outlet of said blower being less than the number of classifying separator boxes whose outlets are connected only to the reduced pressure inlet of said blower.

References Cited by the Examiner

UNITED STATES PATENTS

| | | | |
|---|---|---|---|
| 1,676,969 | 7/28 | Sutton et al. | 209—133 X |
| 2,003,141 | 5/35 | Dorfan | 209—137 X |
| 2,018,669 | 10/35 | Hermann | 209—139 X |
| 2,236,548 | 4/41 | Prouty | 209—154 X |
| 3,010,576 | 11/61 | Haret et al. | 209—35 |

SAMUEL KOREN, *Primary Examiner.*

ABRAHAM G. STONE, *Examiner.*